United States Patent
Gusler et al.

(10) Patent No.: US 6,880,108 B1
(45) Date of Patent: Apr. 12, 2005

(54) RISK ASSESSMENT METHODOLOGY FOR AIX-BASED COMPUTER SYSTEMS

(75) Inventors: Carl Phillip Gusler, Austin, TX (US); Rick A. Hamilton, II, Austin, TX (US); Stephanie E. Woods, Pearland, TX (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 09/364,014

(22) Filed: Jul. 29, 1999

(51) Int. Cl.[7] .............................................. G06F 11/00
(52) U.S. Cl. ........................ 714/37; 714/37; 714/48; 714/57
(58) Field of Search ............................ 714/37, 48, 57, 714/47

(56) References Cited

U.S. PATENT DOCUMENTS

| | | | |
|---|---|---|---|
| 5,047,977 A | * 9/1991 | Hill et al. ...................... | 714/57 |
| 5,253,184 A | 10/1993 | Kleinschnitz ................. | 364/550 |
| 5,500,940 A | * 3/1996 | Skeie .............................. | 714/25 |
| 5,668,944 A | * 9/1997 | Berry ............................. | 714/47 |
| 5,699,403 A | 12/1997 | Ronnen ......................... | 379/32 |
| 5,881,222 A | * 3/1999 | Berry et al. .................. | 714/47 |
| 6,237,114 B1 | * 5/2001 | Wookey et al. ............... | 714/47 |
| 6,260,160 B1 | * 7/2001 | Beyda et al. .................. | 714/27 |
| 6,360,337 B1 | * 3/2002 | Zak et al. ...................... | 714/47 |
| 6,470,464 B2 | * 10/2002 | Bertram et al. ............... | 714/37 |

OTHER PUBLICATIONS

Gusler et al.; IBM RISC System 6000 Brief Operational Risk Assessment; Dec. 29, 1998; pp 1–22.

* cited by examiner

*Primary Examiner*—Robert Beausoliel
*Assistant Examiner*—Michael Maskulinski
(74) *Attorney, Agent, or Firm*—Duke W. Yee; David A Mims, Jr.; Michael R. Nichols

(57) ABSTRACT

The present invention relates to a business method for implementing predefined risk assessment methodology for outputting a series of standardized recommendations. A system administrator or service provider performs a series of hardware, software, and firmware tests on the system. Each test provides the administrator/service provider with a determination output that is standardized into risk assessment levels. Depending on the type of test and the risk level assigned to the determination from the test, the administrator/service provider can recommend various courses of action to lower the risk to the system.

30 Claims, 6 Drawing Sheets

RISK ASSESSMENT METHODOLOGY FOR AIX-BASED COMPUTER SYSTEMS

BACKGROUND OF THE INVENTION

1. Technical Field

The present invention relates to system services technology. More particularly the present invention relates to providing an accurate risk assessment of a computer system. Still more particularly the present invention relates to a business method for providing standardized methodology for assessing a system's health and making appropriate recommendations.

2. Description of Related Art

The UNIX operating system, or "UNIX," "A weak pun on Multics," is an interactive time-sharing operating system invented in 1969 by Ken Thompson after he left Bell Labs and the Multics project, apparently to play games on his scavenged PDP-7 computer (minicomputer sold by Digital Electric Corp. (DEC), (Compaq Computer Corp., 20555 SH 249, Houston, Tex. 77070)). Thompson developed a new programming language 'B', and Dennis Ritchie enhanced 'B' to 'C' and helped develop 'UNIX'.

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements, and storing this information for re-use (in a file called .profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: _read—for reading from the disk unit; _write—for writing to the disk unit; _getch—for reading a character from a terminal; _putch—for writing a character to the terminal; and _ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called inode numbers, are used only within the UNIX operating system kernel itself. While UNIX uses inode number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding inode numbers. Given the name of a file, UNIX looks in the file's directory and obtains the corresponding inode number for the file. With this inode number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct inode is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an inode pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities that require state-of-the-art systems maintenance and diagnostics systems.

Catastrophic failure is defined as any hardware problem, including but not limited to disk, planar, or adapter anomalies, which cause information about data placement or user environment to be lost to the base operating system. It is also possible, though less likely, that such failure incidents can originate within software, due to defects in coding or method of execution.

Practically speaking, the beauty of UNIX is that it suffers fewer catastrophic failures than many other operating systems. Protection of the kernel, for instance, is far greater than is found in Win95/98/NT. However, the complexity of UNIX and the adaptability/configurability of it, means that reconfiguration following such a catastrophic failure can be a far more difficult task than configuring other operating systems. While UNIX based systems tend to fail less often than other operating system, it is harder to recover from those failures because of the complexity of the system. Moreover, UNIX system problems that precipitate failure may have been discoverable for some length of time before the actual failure occurs.

Increased competition in the computer services marketplace is forcing providers to offer services that are both effective and efficient. As billable rates soar, customers are demanding near instantaneous results, placing increasingly higher expectations on performance resources. In light of these spiraling demands, one of the fundamental consulting engagements is to reliably provide the customer with system risk assessment, such that catastrophic errors like the ones described can be avoided through preventative maintenance. Typically, system maintenance guidelines are not enunciated; rather, they are simply carried out by experienced administrators as they are conceived. For instance, system administrators routinely check one or two of the parameters that are crucial to efficient system operation. And frequently, the checks are not performed at regular intervals.

It would be advantageous to provide customers with a risk assessment methodology. It would further be advantageous to provide a standardized methodology for assessing a system's health and making appropriate recommendations. It would be even more advantageous to provide quick response through a defined methodology, affording both effectiveness and efficiency in early stages of a client or customer relationship. It would also be advantageous to provide customers with a streamlined and formalized computer systems risk assessment that prescribes a correct preventative course of action within a minimal time.

SUMMARY OF THE INVENTION

The present invention relates to a business method for implementing predefined risk assessment methodology for outputting a series of standardized recommendations. A system administrator or service provider performs a series of hardware, software, and firmware tests on the system. Each test provides the administrator/service provider with a determination output that is standardized into risk assessment levels. Depending on the type of test and the risk level assigned to the determination from the test, the administrator/service provider can recommend various courses of action to reduce the risk to the system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
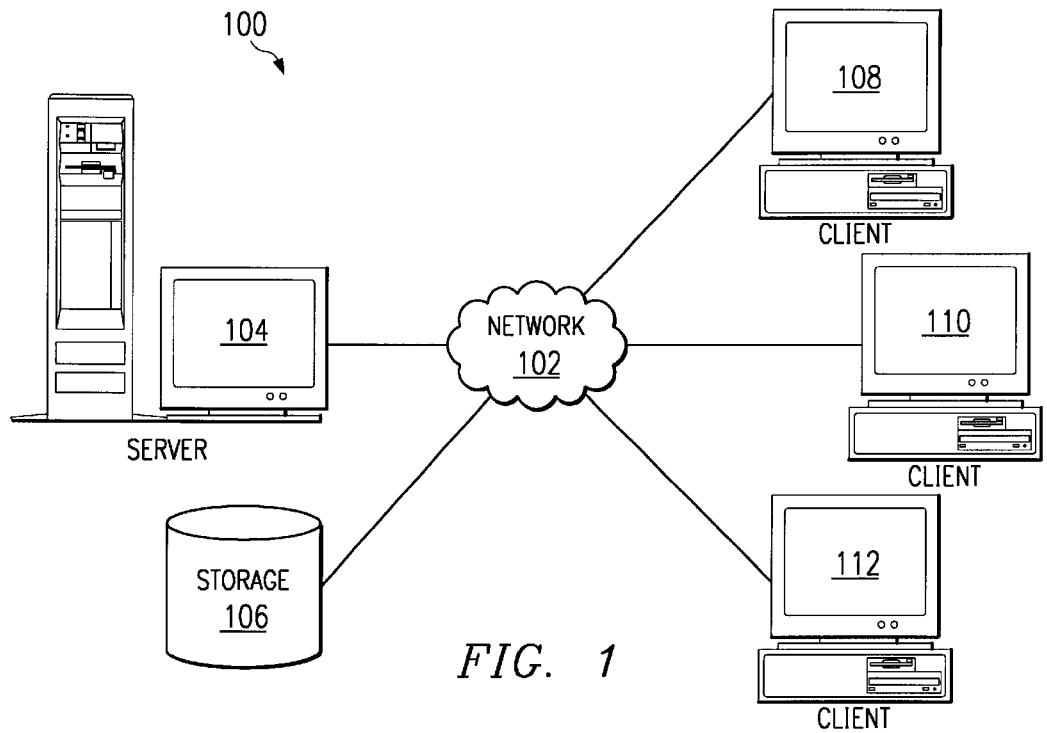
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
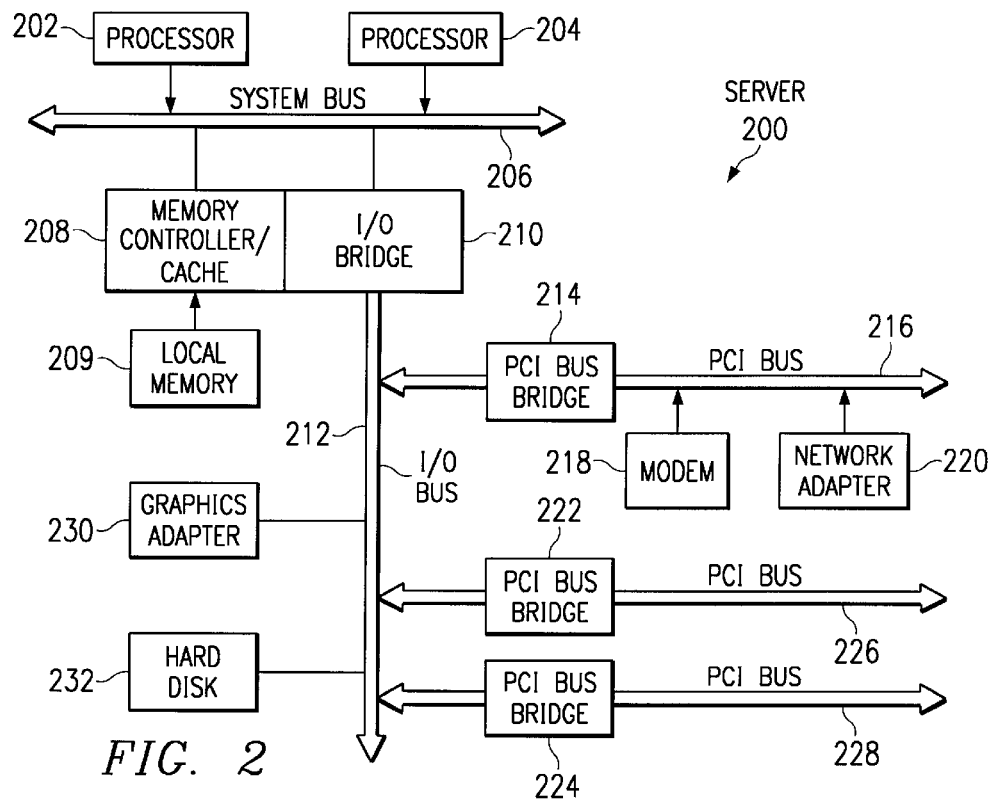
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
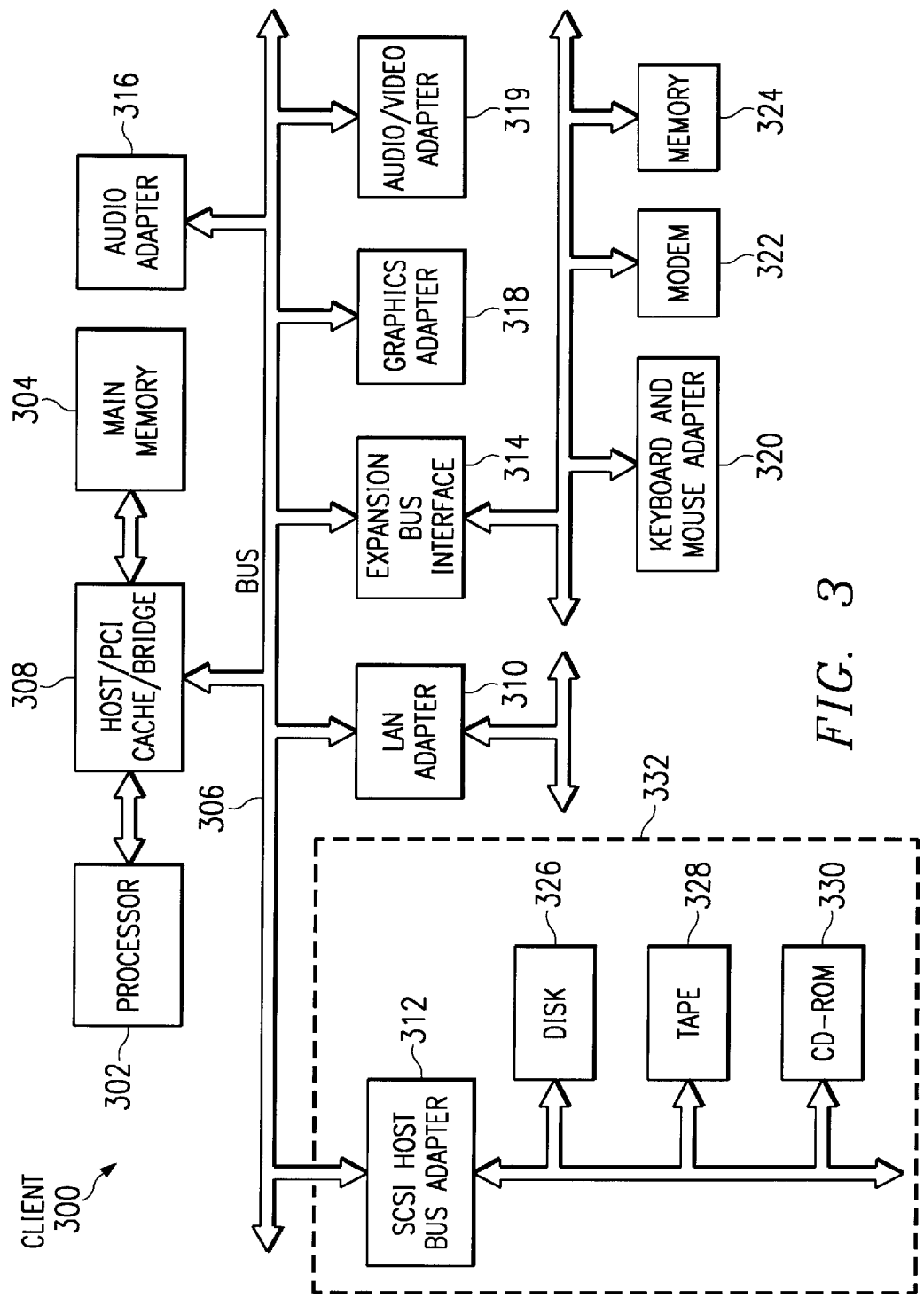
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

Figure 4A:
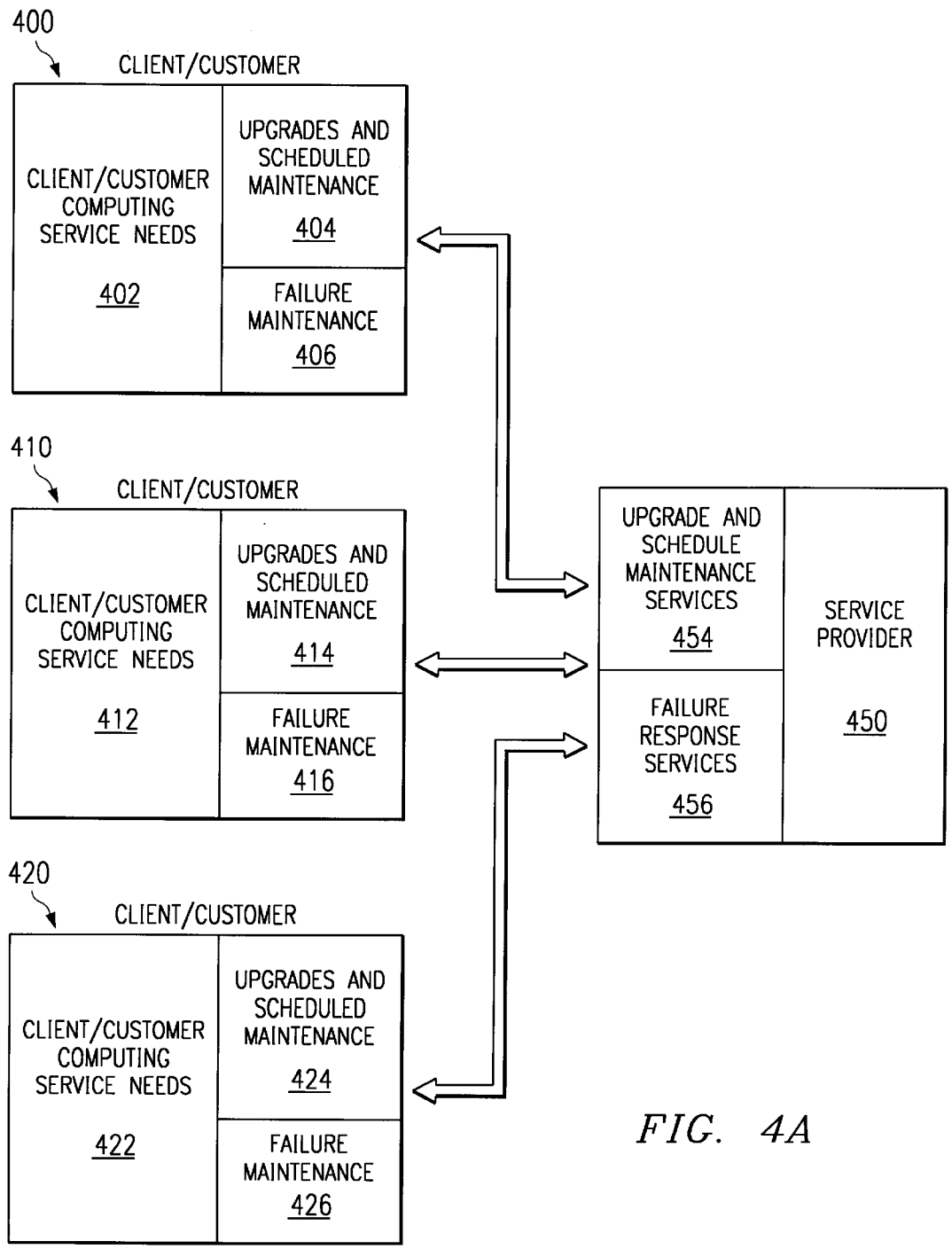
FIGS. 4A and 4B illustrate the relationship between a client's/customer's computing service needs and a computer's service provider.
Figure 4B:
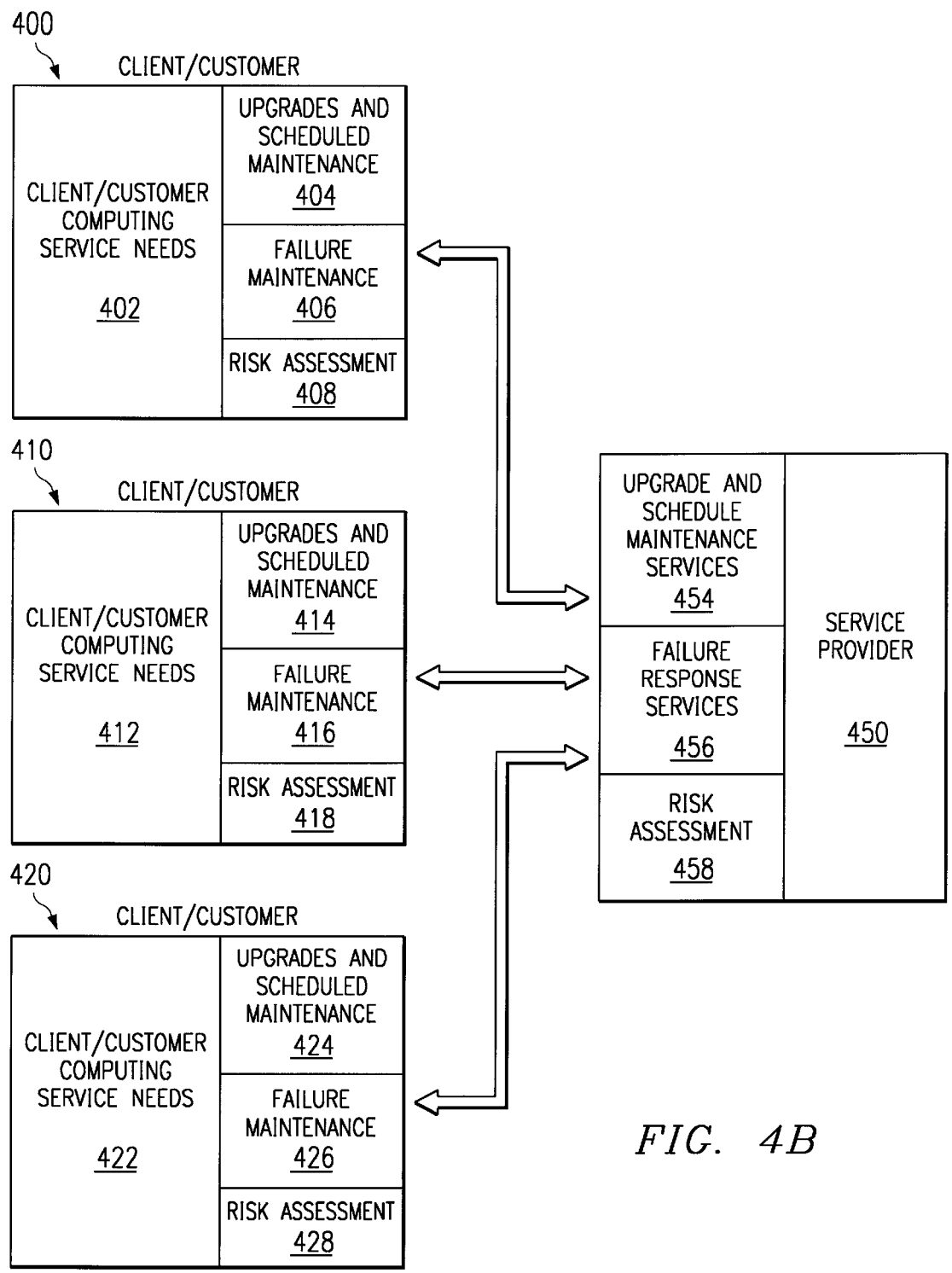

FIGS. 4A and 4B illustrate the relationship between a client's/customer's computing service needs and a computer's service provider. Clients/customers 400, 410 and 420 represent an example of a typical breakdown of services required by typical clients/customers. For the purposes of describing the present invention, in prior art business relationships between clients/customers and service providers, client needs were roughly divided between upgrades and scheduled maintenace, and failure maintenance. For instance, client/customer computing service needs 402 include upgrades and scheduled maintenance 404, and failure maintenance 406. Likewise, client/customer computing service needs 412 include upgrades and scheduled maintenance 414, and failure maintenance 416. Finally, client/customer computer service needs 422 include upgrades and scheduled maintenance 424, and failure maintenance 426.

Each of clients 400, 410 and 420 look to service provider 450 for the majority of their computer service needs. Careful examination of each of clients 400, 410 and 420 reveals that the majority of resources are devoted to upgrades and scheduled maintenance, with the minority focused on failure maintenance. In order to meet this combination of maintenance requirements from its clients, service provider 450 provides upgrade and scheduled maintenance services 454, and failure response maintenance 456 to each of its clients 400, 410 and 420.

Typically, a service provider may have to dedicate more resources to failure response services than to upgrade maintenance services because of the difficulty identifying and responding to one-time system and software failures. Therefore, it would be advantageous to implement a pre-defined methodology for making efficient and effective recommendations based on outputs of a standardized risk assessment process.

FIG. 4B illustrates the relationship between a client's/customer's computing service needs and a computer service provider after implementing a risk assessment methodology in accordance with a preferred embodiment of the present invention. FIG. 4B represents essentially the same service relationship as shown in FIG. 4A, with the exception that FIG. 4B includes a standardized risk assessment plan in the computer service needs of each of clients 400, 410 and 420. Client/customer computing services needs 402 now include standardized risk assessment 408. Likewise, standardized risk assessments 418 and 428 are provided for clients/customers 410 and 420, respectively.

An important aspect of providing standardized risk assessment to each of the clients is the way in which the computing service needs for each of the clients change. For instance, by providing standardized risk assessment, potential failures can be identified and mitigated, thus lessening the need for critical failure maintenance by service provider 450. In a similar manner, standardized risk assessment provides a means for identifying suspect problem areas in the event of a failure. In fact, if service provider 450 provides routine and scheduled risk assessments as part of a scheduled upgrade and maintenance plan, potential problem areas in a client's computing system software may be identified months in advance. Clearly, if potential problems are identified in advance, a client is enabled to plan for upgrade and refocus scheduled maintenance toward potential problem areas.

A standardized risk assessment plan has a synergistic effect on the interplay between failure maintenance, and upgrade and scheduled maintenance. One would expect the frequency and severity of failure maintenance to be reduced; However, what is less obvious is that upgrades and scheduled maintenance precipitated by failure often result in overcompensation for the problems associated with the failure. This is a direct result of the fact that catastrophic failures typically necessitate rapid response under pressure in order to quickly address the problems and ensure that they do not recur.

Standardized risk assessment methodology in accordance with a preferred embodiment of the present invention is a key to competitive professional posturing. The quick response afforded by the present invention affords both effectiveness and efficiency. Although the methodology of a preferred embodiment of the present invention is presented for AIX based operating systems, one of ordinary skill in the art will realize that the features and pseudo code are easily extendible to any UNIX based system.

The following is a detailed discussion of the different risk tests incorporated in a standardized methodology for risk assessment. The discussion is based on the AIX version of UNIX-based operation system for the RS/6000 computing system, both available from IBM but one of ordinary skill in the art would realize that the methodology of the present invention may be easily adapted to all other operating systems.

Operating System Version (AIX Version 4)

AIX Version 4 is the operating system of choice for the RS/6000. AIX V4 offers a number of improvements over AIX V3.2 in system administration, performance, and system efficiency. Improvements include:

Support for much larger file and filesystem sizes.

Support for additional filesystem management (compression, defragmentation).

Bundled Internet client and server features.

Vastly improved software installation and maintenance tools.

Greatly improved graphical interface (COSE CDE).

Support for large multiprocessor servers.

Support for massively parallel systems.

Support for new, high capacity data storage and network peripherals.

Corresponding improvements in SMIT and VSM.

Support for 64-bit applications (Version 4.3).

It should be noted that several releases of AIX Version 4 are currently supported: 4.1, 4.2, and 4.3. Note also that, the most current modification of each release (at the current time) is:

---

4.1.5
4.2.1
4.3.2

---

If a particular machine is at a downlevel release or modification level, such as 4.0.0 or 4.1.3, then an upgrade needs to be conducted as soon as possible. Although such releases below these most current ones are relatively stable, known problems do exist in the older levels. These problems can be eliminated by moving to the most recent modification.

Software Integrity Risks

The most important software integrity risks are associated with installation and maintenance of the operating system and system software. A system may fail a software integrity test if system software was improperly installed or has experienced problems with software maintenance. A system with software integrity problems may run fine in production for years. However, the system will probably fail software upgrades, which usually causes stressful systems management problems when time is of the essence.

Resolving software integrity problems with AIX generally requires assistance directly from IBM Corporation. Resolving these problems requires both AIX skills and access to IBM's repository of AIX software modules.

Hardware Issues

Hardware problems are the highest risk problems posed to system administrators. However, an error log should provide highly detailed information on hardware incidents, including problem sources and recommended action. Detailed reports can be generated from the error log using SMIT (System Management Interface Tool), or from the command line.

SMIT also provides an interface to hardware diagnostic tools that enable the system administrator to perform testing of all the hardware components. Most components can be tested while the system is running, without disrupting productive work flow. More extensive testing can be performed when the system is started in service mode. A customer engineer or services specialist can perform even more sophisticated hardware analysis.

Hard Disk Space Allocation

AIX can be managed most flexibly when sufficient unallocated disk space remains available. This permits space for growth for both applications and the operating system, should it be needed. An RS/6000 can continue to operate, even with all available disk space allocated, as long as the file systems do not overflow. If free space on the disks is limited, and the amount of data on the system continues to grow, then major problems are forthcoming. If preventative steps are not taken and a filesystem overflows, then system errors occur. Depending on which filesystem overflows first, programs may not run, printers may not print, electronic mail may not flow, etc. In the worst case, it will be impossible to run SMIT or other system management utilities.

If file system disk space can be more efficiently allocated, or if old data can be purged, it is possible to reduce the size of filesystems and reclaim disk space. The cron, skulker, and inittab facilities of UNIX can be used to regularly locate and weed out "trash" files. As data requirements continue to increase, however, additional disk drives, or larger disk drives, may be required.

Paging Space Issues

AIX uses disk paging spaces for virtual memory operations. Most systems require that the total available paging space be twice the amount of installed memory. However, some special purpose programs, such as databases, may require that total paging space be as much as five times the amount of real memory. If a system does not have sufficient real memory, performance is degraded. If a system does not have sufficient total paging space, programs will crash.

The required paging space can be spread over all the hard disks on a system. If additional paging space is needed, it is advisable to: (1) increase the size of existing page spaces; or (2) add additional paging spaces to disks that do not currently have page spaces.

Both of these actions can be performed quickly using SMIT. It is important to note, however, that additional page spaces should not be added to a disk that already has a page space. Having more than one page space on a disk can severely impact system performance. It is also important to note that, because current systems can house real memory in the gigabyte range, the old rule of thumb regarding "twice real memory" breaks down and is replaced by a new general rule: If a system has over 512 megabytes of real memory, then paging space should probably be between one time and two times real memory.

File System Allocation

AIX file systems enable more sophisticated system management by administrators. Nonetheless, managing space in AIX file systems still requires planning. All file systems tend to fill up over time as programs and users generate more and larger data files. Although some file systems should be kept as full as possible, others should be kept as empty as possible. Ideally, every file system should be as small as feasible. This maximizes the availability of unallocated disk space for expansion when needed.

Generally, file systems containing executable code should be as full as possible. This includes filesystems with names like /usr, /usr/lpp., etc. These filesystems only need to grow when additional software is installed.

However, the /home filesystem grows as the number of users increases, so there should be some additional capacity in this filesystem. Users that need excessive disk space can have separate filesystems created for them (/home/diskhog.)

The /var filesystem is the lungs of an AIX system. It fills up and empties out as the system breathes. Print jobs and electronic mail are kept here until processed. There should be adequate additional capacity in this filesystem.

The /tmp filesystem is used as a work area by users and programs. It tends to fill up with trash and must be periodically cleaned out. This filesystem should usually have at least 4 megabytes available.

The "/" filesystem, known as the "root" filesystem, also tends to fill up with trash because the root user tends to use root to hold temporary files instead of /tmp. SMIT logs will eventually fill up root unless purged regularly. In other words, the root filesystem is usually the first to fill up. When this happens, unpredictable system problems occur. This filesystem should generally have at least 4 megabytes available.

Security Issues

A wide variety of security issues and concerns exist, and an attempt to cover them all would constitute the writing of a lengthy textbook. However, there are four "best practices" of system security associated with this assessment methodology that provide the best place to start in assessing exposure to system intrusion.

The first command checks to see if the root user can log into the system remotely. Although many organizations permit this without considering the ramifications, it presents a system exposure. Best security practices dictate that users log in as themselves, then "su" to the root user id if they have the password, providing a traceable trail of who is operating as root. In order to change this characteristic, the user can enter "smit user," then select the root user. A field for "remote login" exists, and this can be changed to "false" if the administrator desires.

The next command checks for the existence of passwords for all defined users. If no password exists, the ramifications will vary according to which ID has no password. A user's data may be compromised, or most ominously, the entire system can be compromised if an administrative user has not established a password. Unless highly unusual circumstances exist, all users should have defined passwords.

The next check is for the presence of a leading "." in the path statement. Trojan horse programs can be placed in common areas, such as a /tmp directory. A common trojan horse, perhaps called "ls", would contain such logic as follows:

<create a new administrative user id>
<set up a dummy password for that administrative user>
<execute the real "ls" command from the appropriate directory>
<delete the dummy "ls" command from /tmp to destroy evidence of what has transpired>

If a leading "." is in the root user's path, the above shell script would create an illicit administrative user. If "." is not in the path or behind the binary directories in the path, then the script would never be executed by the root user, and no harm would be done. Note that "." can exist elsewhere in the path statement, but the most common place for its insertion is either first (worst) or last (not recommended, but much lower risk).

The final security command checks for the existence of any other systems defined as equivalent hosts. Valid reasons exist for the /etc/hosts.equiv file to be populated, but (a) the administrator should know and concur with those reasons; and (b) the trusted system should be audited as an extension of the system in question.

Merely performing the above discussed tests at regular intervals may provide some benefits by identifying some potential risks. However, the actions performed by one service provider might be entirely different from a second service provider in response to the same test results. However, by organizing the above discussed tests into a routine and standardizing risk level based outputs in response to the individual tests, a service provider or system administrator can assign an objective risk number to the system. A standardized action plan for identical risk levels can be smoothly implemented. What may be even more important to a service provider is the fact that the provider now has a means to assess risk to a system or assess relative risk between different systems. Thus, the service provider has a tool to provide the system owner with an overall system risk number and a method to compare the owner's system with others under the control of the provider. The service provider may then be able to provide more than merely anecdotal information about the potential pitfalls of failing to respond the system risk.

Figure 5:
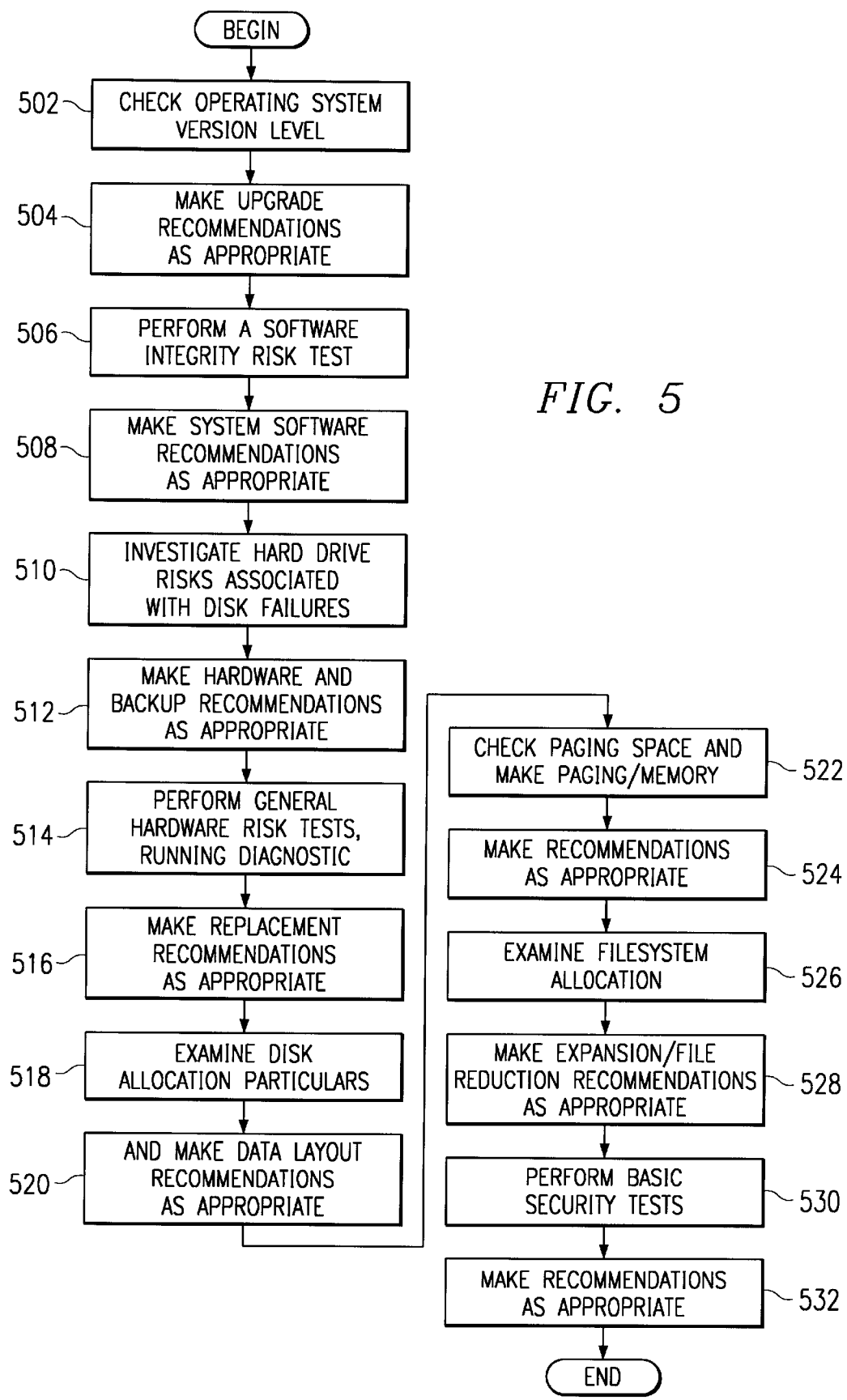
FIG. 5 is a flowchart illustrating a predefined risk assessment methodology for outputting a series of standardized recommendations in accordance with a preferred embodiment of the present invention.

FIG. 5 is a flowchart illustrating a predefined risk assessment methodology for outputting a series of standardized recommendations in response to risk levels assessed from sub-system testing in accordance with a preferred embodiment of the present invention. The process begins with a check of the operating system risk level (step 502). A complete inspection of the operating system version and patches indicates the risk level associated with a particular operating system version. A determination of a particular operating system version may necessitate the service provider to perform different actions depending on the relative risk level associated with the operating system version. For instance, the determination that the operating system version has a relatively low risk level might require no action, and the process would continue. However, a determination that there is a relatively high risk level would require the service provider to make appropriate upgrade recommendations (step 504).

Next, a software integrity risk test is performed (step 506). For instance, the test could be compiled to check for missing or incomplete file sets resident within the computer system. In response to outputting the risk level indicative of the software integrity on a system, the service provider may then make system software recommendations for the computer system (step 508).

The service provider then investigates the hard drive risks associated with disk failures (step 510). This can be performed by a thorough analysis of error logs, with special emphasis on disk errors. Clearly, a few spurious disk errors are of little concern; however, when inspection of the error logs reveals permanent errors or patterns of temporary errors, the risk level increases accordingly. The service provider may then make hardware and backup recommendations as appropriate for the risk level determination (step 512).

Next, a general hardware risk test is performed, including running the normal system diagnostics (step 514). Generally, an error log is available for analysis, either from errors noted during normal system operation or from implementing specific diagnostic utilities. The service provider pays particular attention to recent hardware events, including permanent errors and relatively serious temporary errors. The service provider can then make appropriate recommendations for upgrading the general system hardware (step 516). Here, a determination of only a few temporary errors would indicate a low risk level requiring no action by the service provider. However, a determination of several permanent errors or a pattern of temporary errors would indicate a higher risk level requiring the service provider to consult the hardware references for the associated problem areas.

With reference now to step 518, the service provider examines the disk allocation particulars. A hard disk allocation test may be performed for analyzing a measure of disk space on physical partitions within a disk. A determination of the amount of free disk space as a percentage of the number of free physical partitions indicates the risk level. The service provider may make data layout recommendations as appropriate for the risk level (step 520).

Another important test concerns the paging space and make page/memory check (step 522). Generally, this determination is based on the paging space size with respect to the memory size. Large paging space sizes relative to memory size indicate a low risk level requiring no action by the administrator. However, as the paging space size diminishes with respect to memory size, the risk level increases; and the service provider typically makes paging space allocation recommendations (step 524).

The service provider may also perform a file system allocation test (step 526). In practice, the service provider may merely inspect the file system, especially key file systems, for content that exceeds a predefined percentage of the overall space available. Various disk allocation utilities are commercially available which, when executed, provide a system administrator with a tabular listing of file system parameters associated with each disk or hard drive on the system. Important factors to be considered are the size and speed of the disk, amount of space being used calculated as a percentage of total disk space available.

Another important factor is the manner in which the drive is used. For example, a physical drive with /home mounted on it and determined to be 62-percent utilized, may indicate only a low risk level, requiring no action by the service provider. Conversely, a physical device with /tmp mounted on it and determined to be 62-percent utilized, may indicate a high risk level, indicating poor planning or inexperienced system administration. Depending upon the risk assessment, the service provider may then make data layout recommendations as appropriate (step 528).

The final test to be considered by the service provider is a basic security test. By analyzing security logs, outputs, user IDs, and passwords, a determination based on the number of blank characters or blank character strings in passwords indicates the relative risk level to the system security. The service provider may make appropriate security recommendations based on the number of blank password fields which exist in the system (step 530).

By applying a predefined methodology and by making standardized recommendations based on output, the present invention can quickly and effectively provide operational recommendations. Note that this methodology is not a substitute for proactive AIX system maintenance by a trained specialist. It is, however, a competitive tool that allows a trained specialist to make rapid and effective decisions about operational risk. Furthermore, the methodology of the present invention mitigates the possibility of human oversight, ensuring that major issues are addressed in a timely manner at a client location. The result is increased customer satisfaction with services, software, and hardware, due to increased efficiency and effectiveness. Furthermore, the possibility of oversight is reduced, assessment time is decreased, and preset guidelines for accommodating system anomalies and/or exceptions are predetermined. Said differently, the present invention brings standardization to the art of risk assessment.

Figure 6:
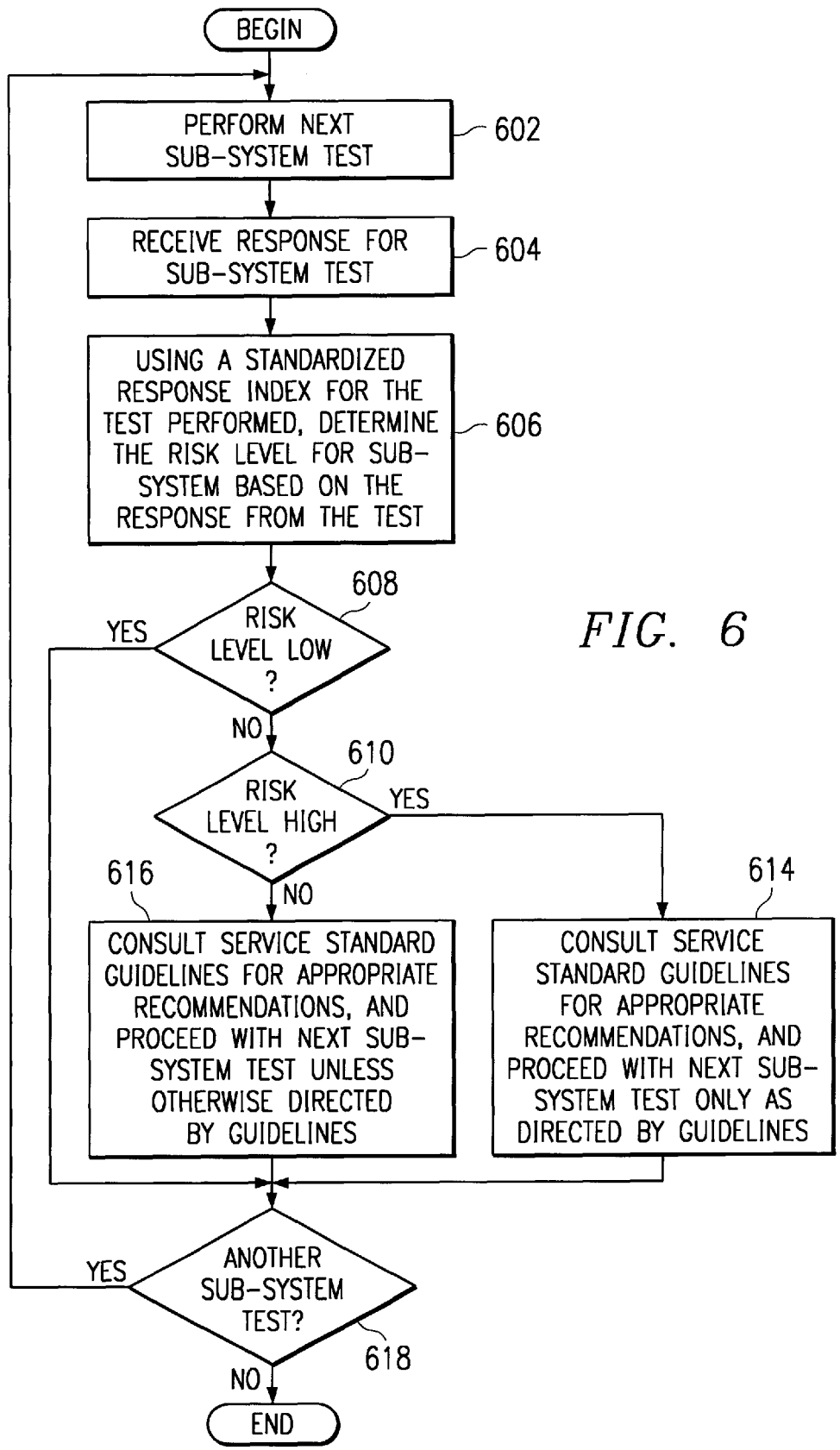
FIG. 6 is a flowchart illustrating a predefined risk assessment methodology for performing sub-system testing, categorizing the test in terms of risk levels and providing standardized recommendations for the sub-system on the basis of the risk.

FIG. 6 is a flowchart illustrating a predefined risk assessment methodology for performing sub-system testing, categorizing the test in terms of risk levels and providing standardized recommendations for the sub-system on the basis of the risk. The process depicted in FIG. 6 related to any of the test shown in step 502, 506, 510, 514, 518, 522, 526 and 530 of FIG. 5.

The process begins by executing the next sub-system test (step 602) and receiving a response from the test (step 604). A risk level assess index is then applied to the test results for the specific sub-system test and a standardized risk level is determined (step 606). If the risk level is LOW, the process flows immediately the step 618 to determine if another sub-system test is to be performed. Otherwise, the process flows from step 608 to step 610 where a determination is made as to whether the risk level is HIGH. If the standardized risk level is HIGH, the subsequent testing is suspended and the service standard guidelines consulted for appropriate recommendations (step 614). The process proceeds with next sub-system only after the problem is remedied and the test is rerun, or, directed by service standard guidelines.

Returning to step 610, if the risk level is not HIGH, and not LOW (step 608 completed previously), then the standardized risk level must be MODERATE. In that case the service provider consults service standard guidelines, and makes appropriate recommendations accordingly. The process then flows to step 618 where ac check is made as to whether another sub-system test is to be executed, unless otherwise directed by guidelines. At step 618 the process flows back the step 602 and the next sub-system test is performed if available. Otherwise from step 618 the process ends.

The process described above is a generic process adaptable to virtually and system and sub-systems. Below are specific sub-system test commands for outputting a test response, including an index for assessing a risk level based on the output of the test. The tests and results discussed below are based on the AIX version of UNIX-based operation system for the RS/6000 computing system, however, one of ordinary skill in the art would realize that the methodology of the present invention may be easily adapted to all other operating systems.

System Software Risk Test uname –am

AIX hostname 1 4 000497545800

This command documents the AIX version and release in use. The single digit in the fourth column (4 in this example) is the AIX version.

| Determination | Risk Level | Action |
|---|---|---|
| If the version is 3: | VERY HIGH | Consult the section labeled AIX Version 3. |
| If the version is 4: | LOW to MODERATE | Continue with the test. |

| oslevel |
|---|
| 4.1.0.0 through 4.1.5.X |
| 4.2.0.0 through 4.2.1.X |
| 4.3.0.0 through 4.3.2.X |

| Determination | Risk Level | Action |
|---|---|---|
| If the command shows AIX 4.1.0 through 4.1.4 | MODERATE | Consult the section labeled AIX Version 4 |
| If the command shows AIX 4.1.5 | LOW | Continue with the test |
| If the command shows AIX 4.2.0 | MODERATE | Consult the section labeled AIX Version 4 |
| If the command shows AIX 4.2.1 | LOW | Continue with the test |
| If the command shows AIX 4.3.0 through 4.3.1 | MODERATE | Consult the section labeled AIX Version 4 |
| If the command shows AIX 4.3.2 | LOW | Continue with the test |

Please continue with the Software Integrity Risk Test.

Software Integrity Risk Test lppchk –v

This command performs an integrity test on installed system software. There should be no output from this command. If the command generates no output, continue on with the Hard Disk Risk Test. If the command generates any messages, then there is HIGH risk associated with system software. Consult the section labeled Software Integrity. Continue with the Hard Disk Risk Test.

Hard Disk Risk Test lsdev –C|grep hdisk hdisk0 Available 00-01-00-00 320 MB SCSI Disk Drive hdisk1 Available 00-01-00-10 857 MB SCSI Disk Drive errpt|grep hdisk The first command shows the types and locations of disk disks installed. The second command shows system log entries associated with the disk disks. If the second command generates no output, there are no recent disk error events. Permanent errors (noted by the letter 'P') are more serious than temporary errors ("T"). The second column of the error report shows the time the problem occurred, in the format MM DD 1111 MM YY. (The 0304142398 shown in the example represents Mar. 4, 1998 at 14:23 hours.)

| Determination | Risk Level | Action |
| --- | --- | --- |
| If the error report shows no errors or only a few temporary errors | LOW | Continue |
| If the error report shows several permanent errors, or a pattern of temporary errors | HIGH to VERY HIGH | Consult the section labeled Hardware Issues |

Continue with the Hardware Risk Test.

Hardware Risk Test errpt –dH|pg

4865FA9B 0221160698 P H rmt0 TAPE OPERATION ERROR

A668F553 0218163198 P H cd0 DISK OPERATION ERROR

This command shows system log entries associated with hardware incidents. If this command generates no output, there are no recent hardware incidents. Permanent errors (note the letter 'P') are more serious than temporary errors ("T"). The second column of the error report shows the time the problem occurred, in the format MM DD HH MM YY. (The 0221160698 shown in the example represents Feb. 21, 1998 at 16:06 hours.) Permanent errors on tape drives and CD-ROM drives may indicate that the drives need cleaning. SMIT should be used to acquire detailed information on entries in the error log.

| Determination | Risk Level | Action |
| --- | --- | --- |
| If the error report shows no errors or only a few temporary errors | LOW | Continue |
| If the error report shows several permanent errors, or a pattern of temporary errors | HIGH to VERY HIGH | Consult the section labeled Hardware Issues |

Continue with the Hard Disk Allocation Test.

Hard Disk Allocation Test lsvg –o|lsvg –i –p

| PV_NAME | PV STATE | TOTAL PPs | FREE PPs | FREE DISTRIBUTION |
| --- | --- | --- | --- | --- |
| vg01: | | | | |
| hdisk2 | active | 287 | 41 | 41 . . . 00 . . . 00 . . . 00 . . . 00 |

-continued

| PV_NAME | PV STATE | TOTAL PPs | FREE PPs | FREE DISTRIBUTION |
| --- | --- | --- | --- | --- |
| rootvg: | | | | |
| hdisk0 | active | 159 | 0 | 00 . . . 00 . . . 00 . . . 00 . . . 00 |
| hdisk1 | active | 159 | 92 | 32 . . . 06 . . . 00 . . . 22 . . . 32 |

This command shows the amount of space available on all the disk installed. "PPs" stands for physical partitions, a unit of measurement of disk space. Each PP usually holds 4 megabytes, although it can be configured to hold more. "Free PPs" indicates the amount of unused disk space on each disk. Add up all the free PPs to determine how much total free disk space is available in the system. Add up all the "Total PPs" to determine how much physical disk space the system contains. Compare these two numbers.

| Determination | Risk Level | Action |
| --- | --- | --- |
| If free disk space is more than 20% of total disk space | LOW | Continue |
| If free disk space is less than 5% of total disk space: | MEDIUM | Consult the section labeled total Hard Disk Space Allocation |

Continue with the Paging Space Allocation Test.

Paging Space Allocation Test

The paging space test is best done while the system is running at full load. However, important information is still provided on an idle system.

| lsdev -C | grep mem | | |
| --- | --- | --- | --- |
| mem0Available 00-H | | 32 MB Memory Card | |
| mem1Available 00-OH | | 32 MB Memory Card | |

| | | | lsps -a | | | |
| --- | --- | --- | --- | --- | --- | --- |
| Page Space | Physical Volume | Volume Group | Size | % Used | Active | Auto |
| hd61 | hdisk1 | rootvg | 40 MB | 49 | yes | yes |
| hd6 | hdisk0 | rootvg | 40 MB | 67 | yes | yes |

The first command shows the number and sizes of memory cards installed. Add up the card sizes to determine total memory. The second command shows the number, locations, sizes, and utilization of paging spaces on the disk disks. Add up the page space sizes to determine total paging space. Compare the total paging space size to the total memory size.

| Determination | Risk Level | Action |
| --- | --- | --- |
| If the paging space size is at least twice the memory size | LOW | Continue |
| If the paging space | LOW to MEDIUM | Consult the section |

-continued

| Determination | Risk Level | Action |
|---|---|---|
| size is not twice the memory size If the system is running at a reasonable user load, and all of entries in the "% Used" column are near 100% | HIGH | labeled Paging Space Issues Consult the section labeled Paging Space Issues |

Continue with the File System Allocation Test.

File System Allocation Test

| | | df -k | | | |
|---|---|---|---|---|---|
| Filesystem | Total KB | free | % used | i used | % i used | Mounted on |
| /dev/hd4 | 4096 | 984 | 75% | 768 | 75% | /9var |
| /dev/hd | 4096 | 2640 | 35% | 114 | 11% | /var |
| /dev/hd2 | 458752 | 6240 | 98% | 20643 | 17% | /usr |
| /dev/hd3 | 8192 | 7900 | 3% | 20 | 0% | /tmp |
| /dev/hd1 | 4096 | 1528 | 62% | 199 | 19% | /home |
| /dev/cd0 | 309446 | 0 | 100% | 154723 | 100% | /usr/lpp/info/En_US |

This command shows how disk space is allocated for the file systems. The important column is the "% used" column (Not the % iused column!). Generally, /usr should be around 95% full, and /usr/lpp/info/En_US should be at 100% full. The / and /home filesystems should range between 50% to 75% full. The /tmp and /var filesystems should be below 40%. Large variations from these suggested percentages generally indicate poor planning or inexperienced system administration.

| Determination | Risk Level | Action |
|---|---|---|
| If /tmp, /var, and / are all below 50% | LOW | Continue |
| If any of the /tmp, /var, or / filesystems are above 75% | MEDIUM | Consult the section labeled File System Allocation |

Continue with the Security Tests.

Security Tests lsuser –f root|grep rlogin
rlogin=false

The above command checks to see if the root user is allowed to log into the system from a remote location. Best security practices dictate that users be forced to log in as themselves, then "su" to the root user id, providing a traceable trail of who is operating as root.

| Determination | Risk Level | Action |
|---|---|---|
| rlogin = false | LOW | Continue |
| rlogin = true | MEDIUM | Consult the section labeled Security |

-continued grep password /etc/security/passwd password = eDJqAw14Ajw2I
password = *
password = *
password = *
password = I48w88Zb2Ki3k The above command checks to see whether any blank password fields exist. None should be present.

| Determination | Risk Level | Action |
|---|---|---|
| All password fields occupied by either "*" or character string | LOW | Continue |
| Blank password fields exist | MEDIUM to VERY HIGH | Consult the section labeled Security | echo $PATH|cut –c 1

This command calls forth the first character in the user path. The risk here is if the current directory is first in the path, then opportunities for trojan horse execution are maximized. The current directory should not be first in the path, so we rather look for the beginning of a directory structure, "/".

| Determination | Risk Level | Action |
|---|---|---|
| First character in path is "/" | LOW | Continue |
| First character in path is "." | MEDIUM | Consult the section labeled Security | grep –v ^# /etc/hosts.equiv daisy.ibmus2.ibm.com

The above command shows the administrator whether or not any other systems are defined as equivalent hosts. If so, then users on the other system may access the current machine freely.

| Determination | Risk Level | Action |
|---|---|---|
| No output is generated | LOW | Continue |
| Other computer systems listed | MEDIUM to VERY HIGH | Consult the section labeled Security |

Other Operational Risks

The tests above do not measure all risks associated with running an RS/6000, but they do detect the most obvious concerns. AIX system administrators are generally concerned about additional operational issues, including data recovery procedures, and system performance.

AIX/6000 is a very powerful operating system. When properly managed, it is the most robust and reliable version of UNIX available. However, even the most skilled and experienced system administrators can be too busy to manage their systems as well as they might like. When system administrators are overworked, it is possible that their systems can experience unexpected vulnerabilities in reliability, integrity, security, performance, and usability. Murphy's Laws say that minor issues turn into serious problems at the most critical times.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A methodology for performing a risk assessment for providing standardized and accurate risk indications for a computing system, comprising:
    executing a first sub-system risk test on a system, wherein the first sub-system risk test on the system is specific to the first sub-system;
    receiving an output in response to executing the sub-system risk test;
    categorizing the output from a plurality of risk categories;
    assessing a first risk level with the risk category of the output; and
    determining sub-system action based on the first sub-system risk test and the first risk level.

2. The risk assessment methodology recited in claim 1, further comprising:
    executing a second sub-system risk test on the system;
    receiving an output in response to executing the second sub-system risk test;
    categorizing the output from a plurality of risk categories;
    assessing a second risk level associated with the risk category of the output; and
    determining preventative sub-system action based on the second sub-system risk test and the second risk level.

3. The risk assessment methodology recited in claim 2, wherein risk levels are at least HIGH risk and LOW risk.

4. The risk assessment methodology recited in claim 2, wherein no action is required in assessing a LOW risk level.

5. The risk assessment methodology recited in claim 3 further comprises:
    executing a second sub-system risk test on a system on the basis of assessing a LOW risk level on the first sub-system risk test.

6. The method of claim 1, wherein the determining step includes:
    using standardized recommendations outputted in response to the risk level and sub-system risk test.

7. The method of claim 1, wherein the risk categories include at least one of an operation system version, software integrity risks, hardware issues, hard disk space allocation, paging space issues, file system allocation, and security issues.

8. The method of claim 1, wherein the sub-system risk test includes at least one of a system software risk test, a software integrity risk test, a hard disk risk test, hardware risk test, a hard disk allocation test, a paging space allocation test, a file system application test, and a security test.

9. A risk assessment methodology for providing standardized and accurate risk indications for a computing system, comprising:
    providing a series of sub-system risk tests for a specific system, for generating a series of outputs in response to the test, wherein each sub-system risk test is performed on a different sub-system of the system;
    providing a risk assessment of each output, wherein the risk assessment ranks the output for each sub-system risk test; and
    providing a preventative system action based on the risk assessment for each sub-system.

10. The risk assessment methodology recited in claim 9, wherein the risk assessment methodology is performed at regular intervals.

11. The risk assessment methodology recited in claim 9, wherein the risk assessment methodology is incorporated in a preventative maintenance plan.

12. The risk assessment methodology recited in claim 9, wherein the risk assessment methodology is performed by service provider personnel.

13. The risk assessment methodology recited in claim 9, wherein the results of the risk assessment methodology are logged.

14. The risk assessment methodology recited in claim 9, wherein the series of sub-system risk tests comprises at least some of a system software risk test, a software integrity risks test, a hardware risk test, a hard disk risk test, a hard disk space allocation test, a paging space allocation test, a file system allocation test, and a security risk test.

15. A methodology for performing a risk assessment for providing standardized and accurate risk indications for a computing system, comprising:
    executing a series of sub-system risk tests on a system, wherein the series of sub-system risk tests on the system are specific to each of the specific sub-systems;
    receiving a series of outputs in response to executing the series of sub-system risk tests;
    standardizing each output in the series of outputs from a plurality of risk categories specific to each sub-system;
    assessing a risk level with the risk category of the output for each sub-system; and
    determining sub-system action for each subsystem based on the sub-system risk test and the risk level.

16. The risk assessment methodology recited in claim 15, wherein the series of sub-system risk tests comprises at least some of a system software risk test, a software integrity risks test, a hardware risk test, a hard disk risk test, a hard disk space allocation test, a paging space allocation test, a file system allocation test, and a security risk test.

17. A system of methodology for performing a risk assessment for providing standardized and accurate risk indications for a computing system, comprising:
    executing means for executing a first sub-system risk test on a system, wherein the first sub-system risk test on the system is specific to the first sub-system;

receiving means for receiving an output in response to executing the sub-system risk test;

categorizing means for categorizing the output from a plurality of risk categories;

assessing means for assessing a first risk level with the risk category of the output; and determining means for determining sub-system action based on the first sub-system risk test and the first risk level.

18. The risk assessment methodology system recited in claim 17, further comprising:

executing means for executing a second sub-system test on the system;

receiving means for receiving an output in response to executing the second sub-system risk test;

categorizing means for categorizing the output from a plurality of risk categories;

assessing means for assessing a second risk level associated with the risk category of the output; and determining means for determining preventative sub-system action based on the second sub-system risk test and the second risk level.

19. The risk assessment methodology system recited in claim 18, wherein risk levels are at least HIGH risk and LOW risk.

20. The risk assessment methodology system recited in claim 18, wherein no action is required on the sub-system in assessing a LOW risk level.

21. The risk assessment methodology system recited in claim 19, further comprises:

executing means for executing a second sub-system risk test on the system on the basis of assessing a LOW risk level on the first sub-system risk test.

22. A system of risk assessment methodology for providing standardized and accurate risk indications for a computing system, comprising:

providing means for providing a series of sub-system risk tests for a specific system, for generating a series of outputs in response to the test, wherein each sub-system risk test is performed on a different sub-system of the system;

providing means for providing a risk assessment of each output, wherein the risk assessment ranks the output for each sub-system risk test; and providing means for providing a preventative system action based on the risk assessment for each sub-system.

23. The risk assessment methodology system recited in claim 22, wherein the risk assessment methodology is performed at regular intervals.

24. The risk assessment methodology system recited in claim 22, wherein the risk assessment methodology is incorporated in a preventative maintenance plan.

25. The risk assessment methodology system recited in claim 22, wherein the risk assessment methodology is performed by service provider personnel.

26. The risk assessment methodology system recited in claim 22, wherein the results of the risk assessment methodology are logged.

27. The risk assessment methodology system recited in claim 22, wherein the series of sub-system risk tests comprises at least some of a system software risk test, a software integrity risks test, a hardware risk test, a hard disk risk test, a hard disk space allocation test, a paging space allocation test, a file system allocation test, and a security risk test.

28. A system of methodology for performing a risk assessment for providing standardized and accurate risk indications for a computing system, comprising:

executing means for executing a series of sub-system risk tests on a system, wherein the series of sub-system risk tests on the system are specific to each of the specific sub-systems;

receiving means for receiving a series of outputs in response to executing the series of sub-system risk tests;

standardizing means for standardizing each output in the series of outputs from a plurality of risk categories specific to each sub-system;

assessing means for assessing a risk level with the risk category of the output for each sub-system; and determining means for determining sub-system action for each subsystem based on the sub-system risk test and the risk level.

29. The risk assessment methodology system recited in claim 28, wherein the series of sub-system risk tests comprises at least some of a system software risk test, a software integrity risks test, a hardware risk test, a hard disk risk test, a hard disk space allocation test, a paging space allocation test, a file system allocation test, and a security risk test.

30. A computer program product in a computer readable medium for implementing methodology for performing a risk assessment for providing standardized and accurate risk indications for a computing system, comprising:

executing instructions for executing a series of sub-system tests on a system, wherein the series of sub-system tests on the system are specific to each of the specific sub-systems;

receiving instructions for receiving a series of outputs in response to executing the series of sub-system tests;

standardizing instructions for standardizing each output in the series of outputs from a plurality of categories specific to each sub-system;

assessing instructions for assessing a risk level with the category of the output for each sub-system; and determining instructions for determining sub-system action for each subsystem based on the sub-system test and the risk level.

* * * * *

UNITED STATES PATENT AND TRADEMARK OFFICE
CERTIFICATE OF CORRECTION

PATENT NO. : 6,880,108 B1
APPLICATION NO. : 09/364014
DATED : April 12, 2005
INVENTOR(S) : Gusler et al.

It is certified that error appears in the above-identified patent and that said Letters Patent is hereby corrected as shown below:

Col. 24, line 42: before "tests on a system" insert --risk--.

Col. 24, line 43: before "on the system" insert --risk--.

Col. 24, line 46: after "sub-system" insert --risk--.

Col. 24, line 48: after "plurality of" insert --risk--.

Col. 24, line 51: before "category" insert --risk--.

Col. 24, line 53: after "sub-system" insert --risk--.

Signed and Sealed this

Eighteenth Day of July, 2006

JON W. DUDAS
*Director of the United States Patent and Trademark Office*